US012585566B2

(12) United States Patent
Weber et al.

(10) Patent No.: US 12,585,566 B2
(45) Date of Patent: Mar. 24, 2026

(54) MAINTENANCE PREDICTION FOR MODULES OF A MICROSCOPE

(71) Applicant: LEICA MICROSYSTEMS CMS GMBH, Wetzlar (DE)

(72) Inventors: Markus Weber, Wetzlar (DE); Stefan Bamberger, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 428 days.

(21) Appl. No.: 18/254,174

(22) PCT Filed: Nov. 15, 2021

(86) PCT No.: PCT/EP2021/081658
§ 371 (c)(1),
(2) Date: May 24, 2023

(87) PCT Pub. No.: WO2022/122308
PCT Pub. Date: Jun. 16, 2022

(65) Prior Publication Data
US 2024/0095145 A1 Mar. 21, 2024

(30) Foreign Application Priority Data

Dec. 9, 2020 (DE) ..................... 10 2020 132 787.0

(51) Int. Cl.
*G06F 11/34* (2006.01)
(52) U.S. Cl.
CPC ...... *G06F 11/3452* (2013.01); *G06F 11/3409* (2013.01)

(58) Field of Classification Search
CPC .............. G06F 11/008; G06F 11/3013; G06F 11/3409; G06F 11/3452; G06F 2201/81; G02B 21/365
(Continued)

(56) References Cited

U.S. PATENT DOCUMENTS 9,599,804 B2 3/2017 Birk et al.
2008/0082283 A1 4/2008 Dixon et al.
(Continued)

FOREIGN PATENT DOCUMENTS

DE 102018209108 A1 9/2019
DE 102018123436 A1 3/2020
(Continued)

OTHER PUBLICATIONS

Frank et al. , DE 102018217903 A1, "Inference Microscopy", Date published: Apr. 23, 2020 (Year: 2020).*

*Primary Examiner* — John H Le
(74) *Attorney, Agent, or Firm* — LEYDIG, VOIT & MAYER, LTD.

(57) ABSTRACT

A module for a microscope includes at least one sensor and/or at least one actuator, and a control and evaluation unit. The control and evaluation unit is configured to determine current parameter values of parameters of the sensor and/or of the actuator, analyze the parameter values using a statistical model stored in the control and evaluation unit to determine an operating state value that characterizes an operating state of the module, and identify the operating state as an abnormal operating state upon determining that the operating state value satisfies a predefined condition with respect to a threshold value.

19 Claims, 2 Drawing Sheets

(58) Field of Classification Search
      USPC ......................................................... 702/182
      See application file for complete search history.

(56)                    References Cited

U.S. PATENT DOCUMENTS

| | | |
|---|---|---|
| 2020/0096974 A1 | 3/2020 | Wittmer et al. |
| 2020/0135332 A1 | 4/2020 | Martin et al. |
| 2020/0202508 A1 | 6/2020 | Amthor et al. |
| 2020/0379454 A1 | 12/2020 | Trinh et al. |
| 2021/0342569 A1 | 11/2021 | Sieckmann et al. |

FOREIGN PATENT DOCUMENTS

| | | |
|---|---|---|
| DE | 102018217903 A1 | 4/2020 |
| DE | 102018133196 A1 | 6/2020 |
| EP | 3671632 A1 | 6/2020 |
| WO | 2005/106671 A2 | 11/2005 |

* cited by examiner

Start — S310

Acquire Data — S312

Bundle Data into Input Vector — S314

Execute Code Using the Statistical Model — S316

Determine an Operating State of the Module — S318

Output Service Message — S320

End — S322

400

410

420

MAINTENANCE PREDICTION FOR MODULES OF A MICROSCOPE

CROSS REFERENCE TO RELATED APPLICATIONS

This application is a U.S. National Phase application under 35 U.S.C. § 371 of International Application No. PCT/EP2021/081658, filed on Nov. 15, 2021, and claims benefit to German Patent Application No. DE 10 2020 132 787.0, filed on Dec. 9, 2020. The International Application was published in German on Jun. 16, 2022 as WO 2022/122308 A1 under PCT Article 21(2).

FIELD

Embodiments of the present invention relate to a module for a microscope and a method and computer program for determining operating states of a module of a microscope.

BACKGROUND

In order to minimize downtimes of microscopes, the respective microscope needs to be regularly maintained and, if necessary, repaired. To ensure most efficient utilization of resources for the regular maintenance, it is necessary to determine an operating state of the microscope, in particular to detect an abnormal operating state. Based on the determined operating state, the need for maintenance can be identified, and the microscope can be maintained and repaired in a targeted manner.

Document U.S. Pat. No. 9,599,804 B2 describes a system where tests are performed on a microscope remotely from a central control server. Evaluation of the tests is performed on the central control server.

Document DE 10 2018 133 196 A1 discloses a method for determining a need for maintenance of a microscope with the aid of an image captured by an image sensor of the microscope. This method detects errors of the microscope which affect the image. It is not possible to detect potential errors before they affect the image or to detect errors which, by nature, do not affect the image. Therefore, it is generally only possible to identify particularly serious errors.

A further disadvantage of the known methods is that they require the incorporation of additional cost-intensive and space-consuming hardware, particularly in the form of sensors or data transmission elements.

SUMMARY

Embodiments of the present invention provide a module for a microscope. The module includes at least one sensor and/or at least one actuator, and a control and evaluation unit. The control and evaluation unit is configured to determine current parameter values of parameters of the sensor and/or of the actuator, analyze the parameter values using a statistical model stored in the control and evaluation unit to determine an operating state value that characterizes an operating state of the module, and identify the operating state as an abnormal operating state based on a determining that the operating state value satisfies a predefined condition with respect to a threshold value.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
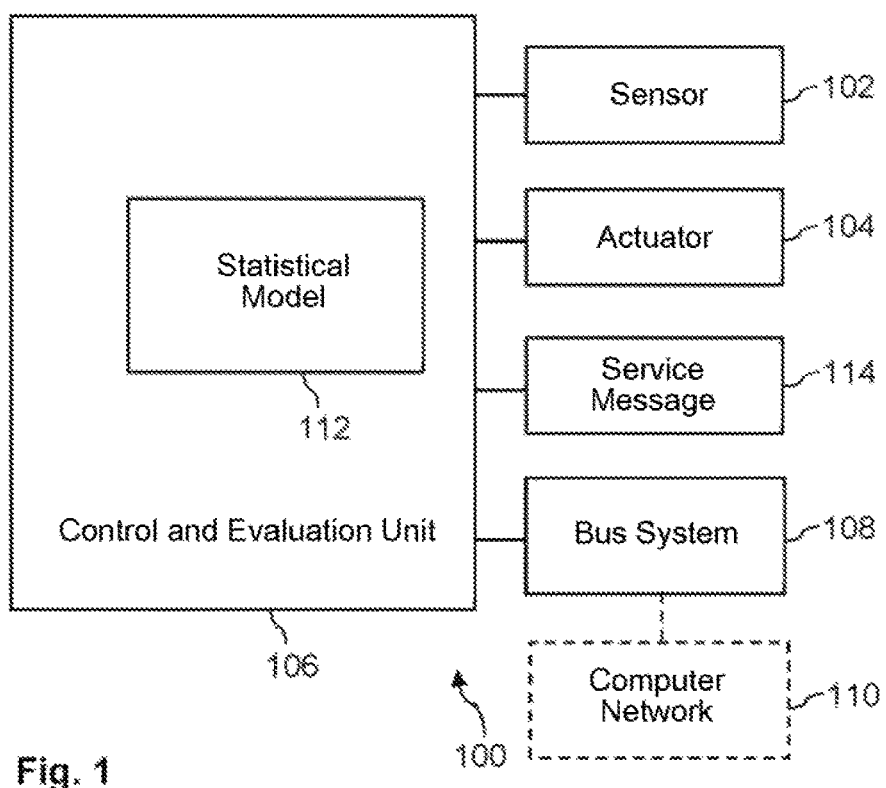
FIG. 1 shows a schematic configuration of a module of a microscope according to some embodiments.

Embodiments of the present invention provide a module for a microscope and a method that determines operating states of the module in a rapid and efficient manner.

The module for a microscope includes at least one actuator and/or at least one sensor as well as a control and evaluation unit. The control and evaluation unit is configured to determine current parameter values of parameters of the sensor and/or of the actuator and to analyze the determined parameter values with the aid of a statistical model stored in the control and evaluation unit. The control and evaluation unit is also configured to determine, on the basis of this analysis, an operating state value which characterizes an operating state of the module and to identify the operating state as an abnormal operating state if the operating state value meets a predefined condition with respect to a threshold value.

The parameters of the sensor or of the actuator are in particular technical performance variables of the sensor or actuator. The actuator is, for example, an electric motor. In this case, the acquired actuator parameter that characterizes the operation may be, for example, the input current of the electric motor or its temperature or its run time over a defined positioning range. The sensor is, for example, a contact sensor which is associated with a positionable module and which provides a contact signal when the module reaches a particular position. If multiple contact sensors are present, it is possible to acquire multiple contact signals and to evaluate, for example, the time intervals therebetween in order to derive a positioning speed as a parameter therefrom.

The parameter values are used as input data for the statistical model. Corresponding output data of the statistical model include the operating state value. In this way, potentially faulty modules, in particular faulty actuators and/or sensors, and the quality of the functions of the module that are monitored by sensors are reliably and preventatively identified, allowing for particularly efficient maintenance and repair. Thus, parameter values of actuators and/or sensors of the module are statistically analyzed with the aid of the control and evaluation unit of the module. The operating state of the module, in particular of the actuators and/or sensors, is determined based on the analysis, thus making it possible to efficiently ascertain a need for preventative maintenance or repair. The operating state describes the deviation or non-deviation of the module from its intended proper function. This function is determined based on the parameter values.

It is advantageous if the threshold value is stored in the control and evaluation unit. This allows for particularly rapid and efficient determination of the operating state.

It is also advantageous if the threshold value is stored in a computer network. The computer network may in particular be what is referred to as a cloud, in which the threshold value is stored in a decentralized fashion. This allows for particularly easy adjustment of the threshold value and enables the operating state to be determined in a particularly flexible manner.

It is advantageous if the threshold value is updatable via a computer network, and in particular in such a manner that the threshold value stored in the control and evaluation unit can be overwritten with another, new threshold value. This enables the operating state to be determined in a particularly flexible manner.

In a advantageous embodiment, the control and evaluation unit includes a microcontroller. The microcontroller makes it possible to determine the operating state of the module in a particularly efficient and rapid manner and, in particular, to determine the operating state in real time. Furthermore, the microcontroller allows for a particularly space-saving design.

It is also advantageous if the statistical model includes a multivariate distribution function. A multivariate distribution function describes the probability that a random variable takes on a value less than or equal to a number x, the value of the random variable being dependent on a plurality of parameters. Such a random variable is also referred to as random vector or as input vector. This makes it possible to detect not only individual errors but also complex changes, such as interactions between parameters, which may result in an error. Instead of checking the respective parameters only individually via the definition of limit values, one limit value is considered for the totality of parameters. Thus, the aim is to detect deviations from the normal condition to thereby determine maintenance or servicing measures prior to a failure; i.e., in a predictive manner. The operating state of the module is thus determined in a particularly reliable and efficient manner.

It is advantageous if the statistical model is created using machine learning. In order to create the statistical model, input data is evaluated ("labeled") by associating the possible value range of the parameter value with, for example, a proper or impaired function of the module or a nonfunction of the module. Thus makes it possible to analyze a particularly large number of parameters and to thereby determine the operating state in a particularly reliable manner.

It is advantageous if the control and evaluation unit is configured to output a service message in the event of an abnormal operating state, it being possible for the service message to be output locally to the microscope and/or via a computer network to a remote device. This makes it possible to respond particularly quickly to an abnormal operating state and to take predictive maintenance measures in a particularly efficient manner.

Furthermore, it is advantageous if the control and evaluation unit is configured to determine the operating state of the module continuously during operation. This makes it possible to ensure uninterrupted operation of the microscope.

It is advantageous if the statistical model stored in the control and evaluation unit is updatable via a computer network. This enables the operating state of the module to be determined in a particularly rapid and efficient manner.

It is also advantageous if the control and evaluation unit is configured to store the parameter values with respective time stamps in the control and evaluation unit and to analyze the parameter values of the respective parameter over time.

In this way, slow changes in the parameter values can be detected particularly easily when determining the operating state.

It is advantageous if the control and evaluation unit is configured to determine the operating state without image data analysis. This enables efficient and rapid determination of the operating state, especially also for modules which have no influence on the image data.

Another aspect of the invention relates to a method for determining an operating state of a module of a microscope, the module including a control and evaluation unit, at least one actuator, and/or at least one sensor. The method includes the following steps: determining current parameter values of parameters of the sensor and/or of the actuator; analyzing the determined parameter values with the aid of a statistical model stored in the control and evaluation unit, and determining, on the basis of this analysis, an operating state value that characterizes an operating state of the module; and identifying the operating state as an abnormal operating state if the operating state value meets a predefined condition with respect to a threshold value.

It is advantageous if the statistical model is created using machine learning. Thus makes it possible to analyze a particularly large number of parameters and to thereby determine the operating state in a particularly reliable manner.

The method may be further refined in the same way as previously described for the module, in particular by the features set forth in the dependent claims.

Another aspect of the invention relates to a computer program having a program code for performing the method for determining an operating state.

A further aspect of the invention relates to a microcontroller having a program code for performing the method for determining an operating state.

Further features and advantages will become apparent from the following description, which, together with the accompanying figures, illustrates exemplary embodiments in greater detail.

FIG. 1 shows a schematic configuration of a module 100 of a microscope. The microscope may in particular be an optical microscope, such as a confocal microscope or a wide-field microscope, such as, for example, a light-sheet microscope. Module 100 includes a sensor 102 and an actuator 104, which each are connected to and controlled by a control and evaluation unit 106.

The microscope includes a plurality of different modules of the type shown in FIG. 1. The modules monitor and/or perform different functions of the microscope. In the exemplary embodiment of FIG. 1, module 100 is a mirror unit which moves a mirror selectively to a position in an optical path of the microscope or to a position outside of the optical path. Thus, the actuator 104 of the mirror unit includes, for example, a motor that moves the mirror. With the aid of sensor 102, it is possible to determine whether the mirror has reached one of the two end positions in response to the motor-driven movement. For this purpose, sensor 102 is, for example, a contact sensor. Actuator 104 includes, in addition to the motor, a motor power stage and a motor encoder.

Further, alternatively, a plurality of sensors 102 and/or a plurality of actuators 104 may be connected to control and evaluation unit 106. Module 100 may, for example, include additional contact sensors that determine other positions of the mirror. Alternatively, it is also possible that only at least one sensor 102 or at least one actuator 104, respectively, may be connected to control and evaluation unit 106.

Other examples of modules of the microscope include: a focus unit that adjusts a motorized focus drive of an objective, a microscope stage unit that moves a motorized microscope stage, and an objective turret unit that changes objectives of the microscope in a motorized manner. Other examples of actuators include motors, such as for belt drives, and solenoids. Other examples of sensors include photoelectric sensors, Hall-effect sensors, microswitches, temperature sensors, air humidity sensors, and rotary encoders.

Control and evaluation unit 106 is in particular a microcontroller. The microcontroller includes at least one processor and a memory element. Such as microcontroller is also referred to as a "system on a chip." Alternatively, control and evaluation unit 106 may include a microprocessor or an integrated circuit such as, for example, a field-programmable gate array. Control and evaluation unit 106 is connected, for example, to an internal bus system 108 of the microscope. Via internal bus system 108, control and evaluation unit 106 receives control commands from an internal system computer of the microscope according to an operating program of the system computer so as to control functions of the microscope. Control and evaluation unit 106 translates these control commands into action with the aid of actuator 104 and sensor 102. Based on the control commands, control and evaluation unit 106 calculates motor control signals in the form of a pulse width modulation value (also called PWM value) and controls the motor via the motor power stage. In this process, control and evaluation unit 106 continuously determines the position of the motor with the aid of the motor encoder and a finite state machine. A finite state machine is an electronic circuit which, based on input data such as a motor encoder signal, determines a limited amount of output data, such as, for example, motor encoder positions. In addition, sensor 102 detects when the mirror reaches one of the two end positions.

During operation of the microscope, parameters of sensor 102 and of actuator 104 are monitored, respectively. The parameters are read by control and evaluation unit 106, and the determined parameter values are analyzed by control and evaluation unit 106.

Parameters which are associated with an electric motor may include, for example, torque, motor current and/or rotational speed, control commands, as well as errors that have occurred. Parameters which are associated with a contact sensor may include, for example, the switching state of the contact, input current, electrical resistance when contact is made, and/or switching times, as well as errors that have occurred.

The respective parameter values may also be generated by control and evaluation unit 106 itself, for example, when controlling the motor with the aid of the motor control signals and the motor power stage, as described further above. Control and evaluation unit 106 may also generate the respective parameter values with the aid of the motor encoder. Moreover, it is possible that control and evaluation unit 106 may determine further, secondary parameter values from primarily determined parameter values.

In addition, parameter values may be provided with a time stamp. This time stamp allows each parameter value to be associated with the point in time and/or period of time at which the parameter values is determined by control and evaluation unit 106.

In no case does module 100, in particular control and evaluation unit 106, determine parameter values from microscope images. In other words, the parameter values are not image data acquired with the aid of an image sensor of the microscope. Moreover, only parameters of actuators 104 and sensors 102 that are necessary for performing functions of the respective module 100 are determined. No actuators or sensors other than those needed anyway for the function of module 100 are incorporated in module 100. This means that there is no need for additional actuators or sensor that would be used solely for determining the operating state of module 100.

Control and evaluation unit 106 is connected via bus system 108 to a computer network 110. Computer network 110 is, for example, a computer at the location of the microscope or a server with which control and evaluation unit 106 can exchange data locally. Alternatively or additionally, computer network 110 may be a distributed cloud which is in particular composed of a plurality of servers interconnected via a network. This allows control and evaluation unit 106 to exchange data with remote external computers.

Furthermore, control and evaluation unit 106 operates with a statistical model 112. Statistical model 112 is stored in control and evaluation unit 106, for example in a memory element of the microcontroller. With the aid of statistical model 112, the parameter values determined by control and evaluation unit 106 are analyzed. For example, an operating state is determined using a method which will be described below in more detail with reference to FIG. 3. Based on the determined operating state, control and evaluation unit 106 may output a service message 114. Statistical model 112 is represented, for example, by a multivariate distribution function.

A multivariate distribution function describes the probability that a random variable takes on a value less than or equal to a number x, the value of the random variable being dependent on a plurality of parameters. Such a random variable is also referred to as random vector or as input vector. In the present case, the input vector includes a plurality of parameter values.

Figure 2:
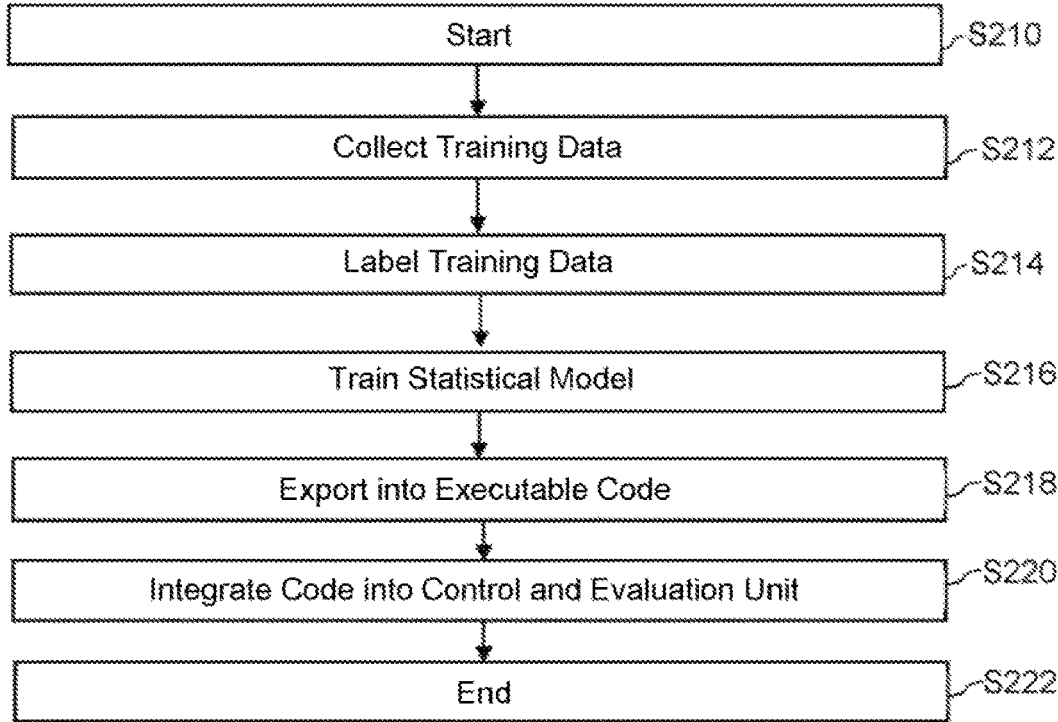
FIG. 2 shows a flowchart of a method for creating a statistical model according to some embodiments.

FIG. 2 shows a flow diagram of a method for creating the statistical model 112, in particular the multivariate distribution function.

The method begins in a step S210. In a step S212, training data of module 100 is collected. This data consists in particular of special parameter values of the parameters associated with actuator 104 or sensor 102. The parameters for module 10 are, for example, control commands corresponding to a target position to which the mirror is to be rotated by actuator 104, a motor encoder position corresponding to a position of a motor shaft, a contact sensor position corresponding to one of the two end positions of the mirror, and a PMW value for controlling actuator 104. These parameter values are determined at short intervals during the operation of module 100. The sampling interval is 100 ms, for example. Preferably, the parameter values are determined for a plurality of modules 100 such that a data set of parameter values is acquired and available for each of the modules 100. Furthermore, care must be taken to ensure that the data set includes both modules with normal operating states and modules with abnormal operating states.

Table 1 shows the so-determined parameter values for module 100, beginning at time 0 ms, with a control command to change position issued at time 100 ms.

TABLE 1

| Time [ms] | Control Command Target Position | Motor Encoder Position | Contact Sensor Position | PWM Value |
|---|---|---|---|---|
| 0 | 1 | 0 | 1 | 0 |
| 100 | 2 | 0 | 1 | 0 |
| 200 | 2 | 250 | 0 | 1000 |
| 300 | 2 | 500 | 0 | 1000 |
| 400 | 2 | 750 | 0 | 500 |
| 500 | 2 | 1000 | 2 | 0 |

In a next step S214, the data sets collected in step S212 are assessed. The assessment of the data sets is also referred to as "labeling" in this context. This labeling is performed, for example, by a development engineer and evaluates whether the parameter values indicate an error at a particular point in time. This labeling corresponds to an assessment of the operating state of module 100, in particular of actuator 104 and sensor 102. The label is here described as a binary variable, for example. Alternatively, the label may be a discrete or continuous variable.

In Table 2, the data determined for module 100 are provided with labels, the label "0" identifying an abnormal operating state of module 100, in particular an error of module 100.

TABLE 2

| Time [ms] | Control Command Target Position | Motor Encoder Position | Contact Sensor Position | PWM Value | Label |
|---|---|---|---|---|---|
| 0 | 2 | 1000 | 2 | 0 | 1 |
| 100 | 1 | 1000 | 2 | 0 | 1 |
| 200 | 1 | 750 | 0 | 1000 | 1 |
| 300 | 1 | 550 | 0 | 1000 | 1 |
| 400 | 1 | 500 | 0 | 600 | 0 |
| 500 | 1 | 450 | 0 | 600 | 0 |
| 600 | 1 | 400 | 0 | 600 | 0 |
| 700 | 1 | 200 | 0 | 500 | 0 |
| 800 | 1 | 0 | 1 | 0 | 0 |

In a step 216, the collected and labeled training data is used in the form of parameter values as input vectors for training the multivariate distribution function. The multivariate distribution function may be, for example, a neural network composed of a plurality of interconnected nodes. The nodes of the neural network process the input vectors and compute an output vector using a weighting scheme and an activation function. During training of the neural network, the weightings of the individual nodes are iteratively varied such that the error between the output vector and the label assigned in step S214 is minimized.

In a step S218, the multivariate distribution function trained in step S216 is exported into executable program code. In this connection, input and output vectors are implemented as transfer parameters. Furthermore, the program code includes an array containing the weightings determined in step S216.

In a step S220, the multivariate distribution function is integrated into control and evaluation unit 106 in the form of the program code exported in step S218. In particular, the multivariate distribution function is stored in the memory element of control and evaluation unit 106. The storage provided for in step S220 may be performed during assembly of the microscope so that the microscope is delivered with the multivariate distribution function stored in module 100. Alternatively, it is possible for the multivariate distribution function to be stored in the memory element at a later time, for example, during a functional upgrade of the microscope. It is further provided for the multivariate distribution function to be updatable, in particular via computer network 110. This allows, for example, for updating from a distributed cloud. The method ends in a step S222.

The method according to FIG. 2 is typically performed on a powerful computer. This computer does not have to be part of the microscope.

Figure 3:
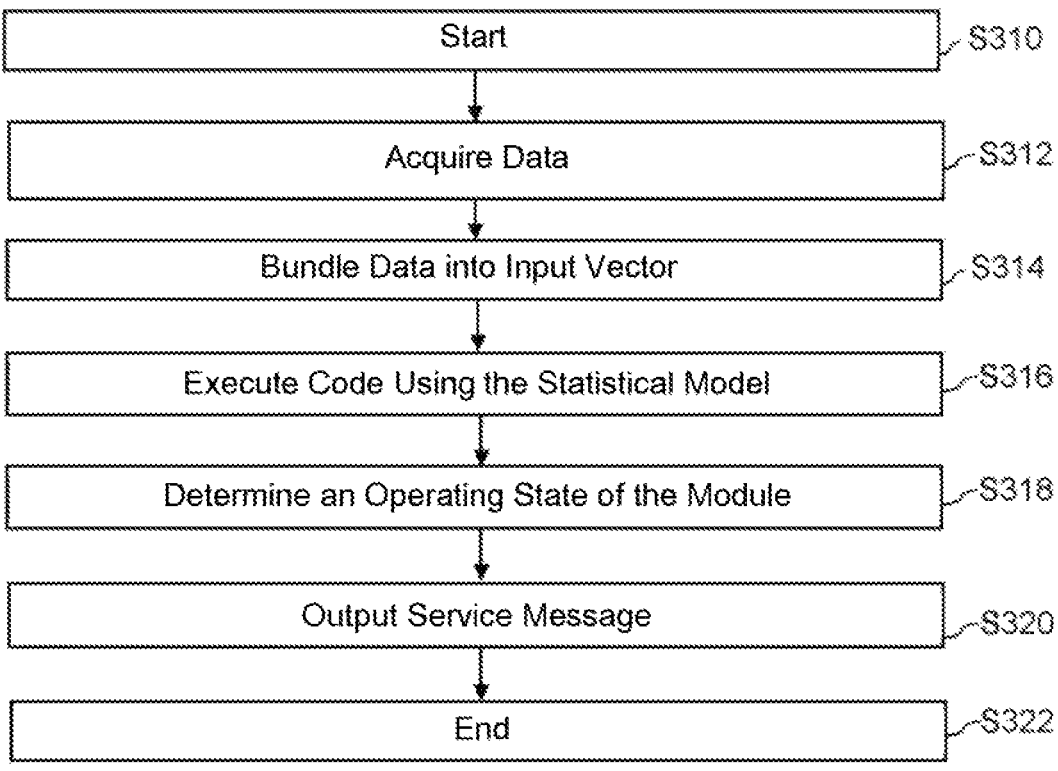
FIG. 3 shows a flowchart of a method for determining operating states of the module of FIG. 1 according to some embodiments.

FIG. 3 shows a flow diagram of a method for determining an operating state of the module 100 of the microscope. The method begins in a step S310. In a step S312, parameter values of actuator 104 and sensor 102 of module 100 are acquired by control and evaluation unit 106 at a time t. In this process, the parameter values are time-stamped so as to allow the acquired parameter values to be correlated with time. The time stamp may, for example, specify a time measured relative to an event. The result may in particular be a functional activation of module 100. Alternatively or additionally, the specified time may be absolute, such as the time of day, with or without date information. The parameters read by control and evaluation unit 106 are in particular control commands corresponding to a target position to which the mirror is to be rotated by the actuator, a motor encoder position corresponding to a position of a motor shaft, a contact sensor position corresponding to one of the two end positions of the mirror, and a PMW value for controlling the actuator.

In step S314, the parameter values determined in step S312 are then bundled into an input vector. Table 3 shows, by way of example, parameter values of such an input vector.

TABLE 3

| Time [ms] | Control Command Target Position | Motor Encoder Position | Contact Sensor Position | PWM Value |
|---|---|---|---|---|
| 200 | 2 | 250 | 0 | 1000 |

In step S316, control and evaluation unit 106 analyzes the input vector using the multivariate distribution function. As a result, the multivariate distribution function outputs an operating state value. This operating state value represents the output vector. In this connection, the parameters used in steps S312 and S314 are identical to the parameters used for training the multivariate distribution function (see the method according to FIG. 2, in particular step S212). The acquisition and processing of the parameter values in steps S312 and S314, as well as the analysis in step S316, are performed continuously in real time. This means that the parameter values are determined at short intervals during the operation of module 100. For example, this may be performed at intervals in a range from 10 ms to 200 ms, in particular at intervals of 100 ms. Moreover, the range of times of less than 10 ms and of greater than 100 ms is also suitable for use. The acquisition of the parameters is substantially dependent on the specifics of the module. The analysis is then performed immediately after the determination of the parameter values. Real-time processing is made possible, for example, by providing that any processing and analysis of the parameter values as well as determination of the operating state take place within module 100, in particular in control and evaluation unit 106. There is no time-consuming and delaying transfer of parameter values or other data for the purpose of determining the operating state.

In step S318, control and evaluation unit 106 then determines an operating state of module 100 based on the output vector. In this process, the output vector is compared to a threshold value. In the event that the output vector falls below the threshold value, the operating state is determined to be abnormal. Thus, the operating state of module 100 is determined based on the parameter values of the module, in particular of parameters of module 100 which are associated with actuator 104 or sensor 102. The threshold value may be transmitted via computer network 110 as described for the multivariate distribution function. This allows, in particular, for updating from a distributed cloud.

Thus, the operating state of module 100 is determined to be abnormal in particular if at least actuator 104 or sensor 102 is in an abnormal operating state. This abnormal operating state may be caused, inter alia, by intrinsic factors such as, for example, an inherently faulty actuator 104, or by extrinsic factors such as, for example, a slowly increasing deterioration of the function of actuator 104 caused by wear or contamination. In either case, the aim is to identify a potential failure of actuator 104 before actuator 104 actually fails, in particular at a point in time at which actuator 104 has not yet failed and the proper functioning of actuator 104 is still guaranteed. As a result, therefore, the proper functioning of the respective module 100 remains guaranteed. In either case, the abnormal operating state of actuator 104 indicates that actuator 104 will fail soon.

In step S320, control and evaluation unit 106 outputs a service message 114 regarding the determined operating state of the microscope. This service message 114 is output in particular when an operating state has been determined to be abnormal. Service message 114 is output on the microscope, in particular on a display unit of the microscope, or on a local computer. Alternatively or additionally, service message 114 is output to a remote service computer via computer network 110. It is thereby possible, for example, to inform a service technician that maintenance is required. Furthermore, service message 114 may include a list of actuators 104 and sensors 102 that exhibit an abnormal operating state. Moreover, based on the list, it is possible to order, preferably automatically, suitable replacement parts or to schedule servicing of the respective microscope. The method ends in a step S322.

Thus, by using the multivariate distribution function, the operating state is determined not only based on individual parameters, but taking into account a plurality parameters and, in particular, also their interactions with each other. This provides a particularly efficient way of identifying a potential failure of module 100 before module 100 actually fails.

The term "and/or" includes any and all combinations of one or more of the associated listed items and may be abbreviated as "/".

Although some aspects have been described in the context of a device, it is clear that these aspects also represent a description of the corresponding method, where a block or device corresponds to a method step or a feature of a method step. Analogously, aspects described in the context of a method step also represent a description of a corresponding block or item or feature of a corresponding device.

Figure 4:
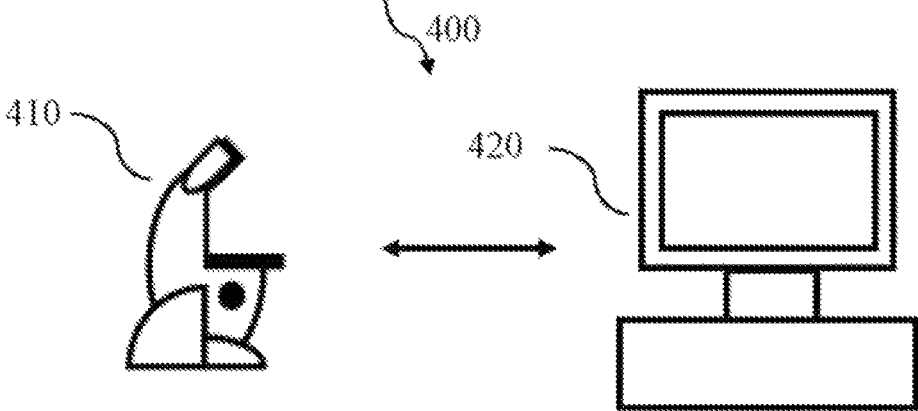
FIG. 4 shows a system including a microscope and a computer system according to some embodiments.

Some exemplary embodiments relate to a microscope that includes a system as described in connection with one or more of FIGS. 1 through 3. Alternatively, a microscope may be part of or connected to a system such as described in connection with one or more of FIGS. 1 through 3. FIG. 4 shows in schematic form a system 400 configured to perform a method as described herein. System 400 includes a microscope 410 and a computer system 420. Microscope 410 is configured to acquire images and is connected to computer system 420. Computer system 420 is configured to perform at least a portion of a method as described herein. Computer system 420 may be configured to execute a machine-learning algorithm. Computer system 420 and microscope 410 may be separate units, but may also be integrated into a common housing. Computer system 420 could be part of a central processing system of microscope 410 and/or computer system 420 could be part of a sub-component of microscope 410, such as a sensor, an actuator, a camera, or an illumination unit, etc., of microscope 410.

Computer system 420 may be a local computer device (e.g., personal computer, laptop, tablet computer, or mobile phone) having one or more processors and one or more memory devices or may be a distributed computer system (i.e., a cloud computing system having one or more processors and one or more memory devices distributed at different locations, such as, for example, at a local client and/or one or more remote server farms and/or data centers). Computer system 420 may include any circuit or combination of circuits. In an exemplary embodiment, computer system 420 may include one or more processors of any type. As used herein, "processor" may mean any type of computing circuit, such as, for example, but not limited to, a microprocessor, a microcontroller, a complex instruction set microprocessor (CISC), a reduced instruction set microprocessor (RISC), a very long instruction word (VLIW) microprocessor, a graphics processor, a digital signal processor (DSP), a multi-core processor, a field-programmable gate array (FPGA) of, for example, a microscope or a microscope component (e.g., camera), or any other type of processor or processing circuit. Other types of circuits that may be included in computer system 420 include a custom-built circuit, an application-specific integrated circuit (ASIC), or the like, such as, for example, one or more circuits (e.g., a communication circuit) for use in wireless devices such as mobile phones, tablet computers, laptop computers, radio phones, and similar electronic systems. Computer system 420 may include one or more memory devices, which may include one or more memory elements suitable for the particular application, such as, for example, a main memory in the form of a random access memory (RAM), one or more hard disks, and/or one or more drives that handle removable media such as CDs, flash memory cards, DVDs, and the like. Computer system 420 may also include a display device, one or more loudspeakers, and a keyboard, and/or a controller, which may include a mouse, a trackball, a touchscreen, a voice recognition device, or any other device allowing a system user to input information to computer system 420 and receive information therefrom.

Some or all of the method steps may be executed by (or using) a hardware apparatus, such as, for example, a processor, a microprocessor, a programmable computer, or an electronic circuit. In some exemplary embodiments, one or more of the most important method steps may be executed by such an apparatus.

Depending on certain implementation requirements, exemplary embodiments of the invention can be implemented in hardware or in software. The implementation can be performed using a non-volatile storage medium such as a digital storage medium, for example a floppy disk, a DVD, a Blu-Ray, a CD, a ROM, a PROM, an EPROM, an EEPROM, or a FLASH memory, having electronically readable control signals stored thereon, which cooperate (or are capable of cooperating) with a programmable computer system such that the respective method is performed. Therefore, the digital storage medium may be computer-readable.

Some exemplary embodiments according to the invention include a data carrier having electronically readable control signals which are capable of cooperating with a programmable computer system such that one of the methods described herein is performed.

Generally, exemplary embodiments of the present invention can be implemented as a computer program product with a program code, the program code being operative for performing one of the methods when the computer program product runs on a computer. The program code may, for example, be stored on a machine-readable carrier.

Other exemplary embodiments include the computer program for performing one of the methods described herein, stored on a machine-readable carrier.

In other words, an exemplary embodiment of the present invention is, therefore, a computer program having a program code for performing one of the methods described herein when the computer program runs on a computer.

A further exemplary embodiment of the present invention is, therefore, a storage medium (or a data carrier or a computer-readable medium) including a computer program stored thereon for performing one of the methods described herein when executed by a processor. The data carrier, the digital storage medium, or the recorded medium are typically tangible and/or non-transitionless. Another exemplary embodiment of the present invention is a device as described herein that includes a processor and the storage medium.

A further exemplary embodiment of the invention is, therefore, a data stream or a sequence of signals representing the computer program for performing one of the methods described herein. The data stream or the sequence of signals may, for example, be configured to be transferred via a data communication connection, for example via the Internet.

A further exemplary embodiment includes a processing means, for example, a computer or a programmable logic device, configured or adapted to perform one of the methods described herein.

A further exemplary embodiment includes a computer having installed thereon the computer program for performing one of the methods described herein.

A further exemplary embodiment according to the invention includes an apparatus or a system configured to transfer (for example, electronically or optically) a computer program for performing one of the methods described herein to a receiver. The receiver may, for example, be a computer, a mobile device, a memory device, or the like. The apparatus or system may, for example, include a file server for transferring the computer program to the receiver.

In some exemplary embodiments, a programmable logic device (e.g., a field-programmable gate array, FPGA) may be used to perform some or all of the functionalities of the methods described herein. In some exemplary embodiments, a field-programmable gate array may cooperate with a microprocessor in order to perform one of the methods described herein. Generally, the methods are preferably performed by any hardware apparatus.

Exemplary embodiments may be based on the use of a machine-learning model or a machine-learning algorithm. Machine learning may refer to algorithms and statistical models that can be used by computer systems to perform a particular task without using explicit instructions, instead of relying on models and interference. Instead of using rule-based data transformation, machine learning may, for example, use a data transformation that may be derived from an analysis of historical and/or training data. For example, the content of images may be analyzed using a machine-learning model or using a machine-learning algorithm. In order for the machine-learning model to be able to analyze the content of an image, the machine-learning model may be trained using training images as input and training content information as output. By training the machine-learning model with a large number of training images and/or training sequences (e.g., words or sentences) and associated training content information (e.g. labels or annotations), the machine-learning model "learns" to recognize the content of the images, so the content of images that are not included in the training data can be recognized using the machine-learning model. The same principle can also be used for other types of sensor data: By training a machine-learning model using training sensor data and a desired output, the machine-learning model "learns" a transformation between the sensor data and the output, which can be used to provide an output based on non-training sensor data provided to the machine-learning model. The provided data (e.g., sensor data, meta data, and/or image data) may be preprocessed to obtain a feature vector, which is used as input to the machine-learning model.

Machine-learning models may be trained using training input data. The examples given above use a training method called "supervised learning." In supervised learning, the machine-learning model is trained using a plurality of training samples, each of which may include a plurality of input data values and a plurality of desired output values; i.e., each training sample is associated with a desired output value. By specifying both training samples and desired output values, the machine-learning model "learns" which output value to provide based on an input sample that is similar to the samples provided during the training. Apart from supervised learning, semi-supervised learning may also be used. In semi-supervised learning, some of the training samples lack a desired output value. Supervised learning may be based on a supervised learning algorithm (e.g., a classification algorithm, a regression algorithm, or a similarity learning algorithm). Classification algorithms may be used when the outputs are restricted to a limited set of values (categorical variables); i.e., the input is classified as one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may also be used to train the machine-learning model. In unsupervised learning, (only) input data might be supplied and an unsupervised learning algorithm may be used to find structure in the input data (e.g., by grouping or clustering the input data, finding commonalities in the data). Clustering is the assignment of input data including a plurality of input values into subsets (clusters) so that input values within the same cluster are similar according to one or more (predefined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may include a feature learning component. Feature learning algorithms, which may be called representation learning algorithms, may preserve the information in their input but transform it in a way that makes it useful, often as a pre-processing step before performing classification or predictions. Feature learning may be based on principal components analysis or cluster analysis, for example.

In some examples, anomaly detection (i.e., outlier detection) may be used, which is aimed at providing an identification of input values that raise suspicions by differing significantly from the majority of input or training data. In other words, the machine-learning model may at least partially be trained using anomaly detection, and/or the machine-learning algorithm may include an anomaly detection component.

In some examples, the machine-learning algorithm may use a decision tree as a predictive model. In other words, the machine-learning model may be based on a decision tree. In a decision tree, observations about an item (e.g., a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may, for example, be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or a set of rules that represents the learned knowledge (e.g., based on the training performed by the machine-learning algorithm). In exemplary embodiments, the use of a machine-learning algorithm may imply the use of an underlying machine-learning model (or of a plurality of underlying machine-learning models). The use of a machine-learning model may imply that the machine-learning model and/or the data structure/the set of rules that is/are the machine-learning model is/are trained by a machine-learning algorithm.

For example, the machine-learning model may be an artificial neural network (ANN). ANNs are systems that are inspired by biological neural networks, such as can be found in a retina or a brain. ANNs include a plurality of interconnected nodes and a plurality of connections, so-called edges, between the nodes. There are usually three types of nodes: input nodes which receive input values, hidden nodes which are (only) connected to other nodes, and output nodes which provide output values. Each node may represent an artificial neuron. Each edge may transmit information, from one node to another. The output of a node may be defined as a (non-linear) function of the inputs (e.g., of the sum of its inputs). The inputs of a node may be used in the function based on a "weight" of the edge or of the node that provides the input. The weight of nodes and/or edges may be adjusted in the learning process. In other words, the training of an artificial neural network may include adjusting the weights of the nodes and/or edges of the artificial neural network; i.e., to achieve a desired output for a given input.

Alternatively, the machine-learning model may be a support vector machine, a random forest model, or a gradient boosting model. Support vector machines (i.e., support vector networks) are supervised learning models with associated learning algorithms that may be used to analyze data (e.g., in classification or regression analysis). Support vector machines may be trained by providing an input including a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100 module
102 sensor
104 actuator
106 control and evaluation unit
108 bus system 110 computer network
112 statistical model
114 service message
400 system
410 microscope
420 computer system

The invention claimed is:

1. A module for a microscope, the module comprising:
at least one sensor and at least one actuator, wherein the
at least one sensor monitors functions of the micro-
scope, and wherein the at least one actuator executes
the functions of the microscope, and
a control and evaluation unit,
the control and evaluation unit being configured to:
determine current parameter values of parameters of the
sensor and/or of the actuator,
analyze the parameter values by providing as input the
current parameter values of the parameters of the
sensor and/or of the actuator to a statistical model
stored in the control and evaluation unit that is config-
ured to determine, as output, an operating state value
that characterizes an operating state of the module and
the microscope, and
identify the operating state as an abnormal operating state
based on determining that the operating state value
satisfies a predefined condition with respect to a thresh-
old value.

2. The module as claimed in claim 1, wherein the thresh-
old value is stored in the control and evaluation unit.

3. The module as claimed in claim 1, wherein the thresh-
old value is stored in a computer network.

4. The module as claimed in claim 1, wherein the thresh-
old value is updatable via a computer network.

5. The module as claimed in claim 1, wherein the control
and evaluation unit comprises a microcontroller.

6. The module as claimed in claim 1, wherein the statis-
tical model includes a multivariate distribution function.

7. The module as claimed in claim 6, wherein the statis-
tical model is trained using labeled parameter values as input
vectors derived from the at least one sensor and/or the at
least one actuator of the microscope.

8. The module as claimed in claim 1, wherein the statis-
tical model is created using machine learning.

9. The module as claimed in claim 1, wherein the control
and evaluation unit is configured to, upon identifying the
operating state as the abnormal operating state, output a
service message to the microscope locally and/or to a remote
device via a computer network.

10. The module as claimed in claim 1, wherein the control
and evaluation unit is configured to determine the operating
state of the module continuously during operation.

11. The module as claimed in claim 1, wherein the
statistical model stored in the control and evaluation unit is
updatable via a computer network.

12. The module as claimed in claim 1, wherein the control
and evaluation unit is configured to store the parameter
values with respective time stamps in the control and
evaluation unit and to analyze the parameter values of the
respective parameter over time.

13. The module as claimed in claim 1, wherein the control
and evaluation unit is configured to determine the operating
state without image data analysis.

14. The module as claimed in claim 1, wherein the control
and evaluation unit is connected to an internal bus system of
the microscope for receiving control commands from an
internal system computer of the microscope so as to control
the functions of the microscope by translating the control
commands into actions via the at least one actuator and the
at least one sensor.

15. The module as claimed in claim 1, wherein the
parameters of the sensor and/or of the actuator include
particular control commands including a target position to
which a mirror of the microscope is to be rotated by the
actuator, a motor encoder position corresponding to a posi-
tion of a motor shaft of the microscope, a contact sensor
position corresponding to one of two end positions of the
mirror, and a pulse width modulation (PWM) value for
controlling the actuator.

16. A method for determining an operating state of a
module of a microscope, the module including a control and
evaluation unit, at least one sensor, and at least one actuator,
the method comprising:
determining current parameter values of parameters of the
sensor and/or of the actuator, wherein the at least one
sensor monitors functions of the microscope, and
wherein the at least one actuator executes the functions
of the microscope,
analyzing the parameter values by providing as input the
current parameter values of the parameters of the
sensor and/or of the actuator to a statistical model
stored in the control and evaluation unit that is config-
ured to determine, as output, an operating state value
that characterizes the operating state of the module and
the microscope, and
identifying the operating state as an abnormal operating
state based on determining that the operating state
value satisfies a predefined condition with respect to a
threshold value.

17. The method as claimed in claim 16, wherein the
statistical model is created using machine learning.

18. A computer program having a program code for
performing the method according to claim 16.

19. A microcontroller having a program code stored
thereon which, when executed, is configured to perform a
method for determining an operating state of a module of a
microscope, the module including at least one sensor and at
least one actuator, the method comprising:
determining current parameter values of parameters of the
sensor and/or of the actuator, wherein the at least one
sensor monitors functions of the microscope, and
wherein the at least one actuator executes the functions
of the microscope,
analyzing the parameter values by providing as input the
current parameter values of the parameters of the
sensor and/or of the actuator to a statistical model
stored in the control and evaluation unit that is config-
ured to determine, as output, an operating state value
that characterizes the operating state of the module and
the microscope, and
identifying the operating state as an abnormal operating
state based on determining that the operating state
value satisfies a predefined condition with respect to a
threshold value.

* * * * *